(12) United States Patent
A et al.

(10) Patent No.: US 10,374,886 B1
(45) Date of Patent: Aug. 6, 2019

(54) PROCESSING MULTIPLE PARALLEL HIGH LEVEL CONFIGURATION CHANGES FOR MANAGED NETWORK DEVICES

(71) Applicant: Juniper Networks, Inc., Sunnyvale, CA (US)

(72) Inventors: Chandrasekhar A, Bangalore (IN); Nirmal Anburose, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 232 days.

(21) Appl. No.: 15/396,262

(22) Filed: Dec. 30, 2016

(51) Int. Cl.
*G06F 15/177* (2006.01)
*H04L 12/24* (2006.01)

(52) U.S. Cl.
CPC ............ *H04L 41/082* (2013.01); *H04L 41/12* (2013.01); *H04L 41/20* (2013.01)

(58) Field of Classification Search
USPC ....................................... 709/220, 221, 222
See application file for complete search history.

(56) References Cited

U.S. PATENT DOCUMENTS

| | | | |
|---|---|---|---|
| 7,804,832 | B2 | 9/2010 | Andrews et al. |
| 2016/0246582 | A1 | 8/2016 | Benton |

OTHER PUBLICATIONS

Harrington et al., "An Architecture for Describing Simple Network Management Protocol (SNMP) Management Frameworks," Network Working Group, RFC 3411, Dec. 2002, 64 pp.
Enns, "NETCONF Configuration Protocol," Network Working Group, RFC 4741, Dec. 2006, 99 pp.
Bjorklund, "YANG—A Data Modeling Language for the Network Configuration Protocol (NETCONF)," Internet Engineering Task Force (IETF), RFC 6020, Oct. 2010, 173 pp.
U.S. Appl. No. 15/198,657, by Juniper Networks, Inc., (Inventor: Jiang), filed Jun. 30, 2016.
U.S. Appl. No. 15/396,300, by Juniper Networks, Inc., (Inventors: Chandrasekhar et al.), filed Dec. 30, 2016.
"Recurrent Layers—Keras Documentation," Keras, accessed on Nov. 30, 2016, from https://keras.io/layers/recurrent/, 5 pp.
Sutskever, et al., "Sequence to Sequence Learning with Neural Networks," Proceeding NIPS'14 Proceedings of the 27th International Conference on Neural Information Processing Systems, Dec. 8-13, 2014; pp. 3104-3112.

*Primary Examiner* — Lan Dai T Truong
(74) *Attorney, Agent, or Firm* — Shumaker & Sieffert, P.A.

(57) ABSTRACT

In one example, a network management system (NMS) device manages a plurality of network devices. The NMS device includes a processor configured to determine a first set of differences between an existing high-level configuration for the plurality of network devices and a first received high-level configuration for the plurality of network devices, determine a second set of differences between the existing high-level configuration and a second received high-level configuration, wherein the second received high-level configuration is received separately from the first received high-level configuration, translate the first set of differences to a first low-level configuration modification, translate the second set of differences to a second low-level configuration modification, merge the first low-level configuration modification and the second low-level configuration modification, and apply the merged low-level configuration modification to low-level configuration of the plurality of network devices.

38 Claims, 6 Drawing Sheets

PROCESSING MULTIPLE PARALLEL HIGH LEVEL CONFIGURATION CHANGES FOR MANAGED NETWORK DEVICES

TECHNICAL FIELD

This disclosure relates to computer networks, and more particularly, to management of network devices.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. NM Systems may support these services such that an administrator can easily create and manage these high level network configuration services. In most of the customer deployments, the connectivity services are in thousands to millions. When the services are changed, the NM System typically deploys in the network via transactions. In some cases, there may be concurrent changes across the devices, as multiple administrators may modify the services in parallel.

In order to configure devices to perform the services, a user (such as an administrator) may write translation programs that translate high-level configuration instructions (e.g., instructions according to a network service model) to low-level configuration instructions (e.g., instructions according to a device configuration model). As part of configuration service support, the user/administrator may provide a service model and a mapping between the service model to a device configuration model.

In order to simplify the mapping definition for the user, NMS devices may be designed to provide the capability to define the mappings in a simple way. For example, some NMS devices provide the use of Velocity Templates and/or Extensible Stylesheet Language Transformations (XSLT). Such translators contain the translation or mapping logic from the high-level service model to the low-level device configuration model. Typically, a relatively small number of changes in the high-level service model impact a relatively large number of properties across device configurations. Different translators may be used when services are created, updated, and deleted from the high-level service model.

SUMMARY

In general, this disclosure describes techniques for managing network devices. A network management system (NMS) device may receive two or more parallel changes to a high level model of configuration information. The high level model may represent configuration information for a wide variety of devices. The NMS device may then determine differences between the high level models of newly received configuration and existing high level model configuration. The NMS device may then translate each of the differences to low level model configuration modifications, where the low level models may represent device level configuration information. In some instances, conflicts may arise between the low level model configuration changes that were not readily apparent from the high level models. According to the techniques of this disclosure, the NMS device may detect such conflicts and attempt to resolve the conflicts, e.g., by merging the low level model configuration modifications.

This disclosure describes an approach to detect and resolve dependent conflicts in high level services changes across private data stores. This disclosure also describes techniques for supporting patches on drafting of configuration information. The techniques also support concurrent service transactions, as transaction integrity may be provided without locking the managed devices through the configuration transaction. This disclosure also describes an approach to maintain transactions during commits of the private data store, irrespective of whether a database (device or application) supports transactions or not. This disclosure describes an example configuration change format that may be used to capture a snapshot of old values, which can be used during transaction rollback. This disclosure further describes service level transactions with rollbacks, which may be applied even when rollback is not supported on managed devices.

In one example, a method is performed by a network management system (NMS) device that manages a plurality of network devices. The method includes determining a first set of differences between an existing high-level configuration for the plurality of network devices and a first received high-level configuration for the plurality of network devices, determining a second set of differences between the existing high-level configuration for the plurality of network devices and a second received high-level configuration for the plurality of network devices, wherein the second received high-level configuration is received separately from the first received high-level configuration, translating the first set of differences to a first low-level configuration modification for the plurality of network devices, translating the second set of differences to a second low-level configuration modification for the plurality of network devices, merging the first low-level configuration modification and the second low-level configuration modification to produce a merged low-level configuration modification, and applying the merged low-level configuration modification to low-level configuration of the plurality of network devices.

In another example, a network management system (NMS) device manages a plurality of network devices. The NMS device includes a first interface configured to receive high-level configuration for the plurality of network devices.

The NMS device also includes a second interface configured to communicate low-level configuration to the plurality of network devices. The NMS device further includes one or more processing units, implemented using digital logic circuitry, configured to determine a first set of differences between an existing high-level configuration for the plurality of network devices and a first received high-level configuration, received via the first interface, for the plurality of network devices, determine a second set of differences between the existing high-level configuration for the plurality of network devices and a second received high-level configuration, received via the first interface, for the plurality of network devices, wherein the second received high-level configuration is received separately from the first received high-level configuration, translate the first set of differences to a first low-level configuration modification for the plurality of network devices, translate the second set of differences to a second low-level configuration modification for the plurality of network devices, merge the first low-level configuration modification and the second low-level configuration modification to produce a merged low-level configuration modification, and apply, via the second interface, the merged low-level configuration modification to low-level configuration of the plurality of network devices.

In another example, a system includes a plurality of network devices, and a network management system (NMS) device that manages the plurality of network devices. The NMS device includes a first interface configured to receive high-level configuration for the plurality of network devices. The NMS device also includes a second interface configured to communicate low-level configuration to the plurality of network devices. The NMS device further includes one or more processing units, implemented using digital logic circuitry, configured to determine a first set of differences between an existing high-level configuration for the plurality of network devices and a first received high-level configuration, received via the first interface, for the plurality of network devices, determine a second set of differences between the existing high-level configuration for the plurality of network devices and a second received high-level configuration, received via the first interface, for the plurality of network devices, wherein the second received high-level configuration is received separately from the first received high-level configuration, translate the first set of differences to a first low-level configuration modification for the plurality of network devices, translate the second set of differences to a second low-level configuration modification for the plurality of network devices, merge the first low-level configuration modification and the second low-level configuration modification to produce a merged low-level configuration modification, and apply, via the second interface, the merged low-level configuration modification to low-level configuration of the plurality of network devices.

In another example, a computer-readable storage medium has stored thereon instructions that, when executed, cause a processor of a network management system (NMS) device that manages a plurality of network devices to determine a first set of differences between an existing high-level configuration for the plurality of network devices and a first received high-level configuration for the plurality of network devices, determine a second set of differences between the existing high-level configuration for the plurality of network devices and a second received high-level configuration for the plurality of network devices, wherein the second received high-level configuration is received separately from the first received high-level configuration, translate the first set of differences to a first low-level configuration modification for the plurality of network devices, translate the second set of differences to a second low-level configuration modification for the plurality of network devices, merge the first low-level configuration modification and the second low-level configuration modification to produce a merged low-level configuration modification, and apply the merged low-level configuration modification to low-level configuration of the plurality of network devices.

The details of one or more examples are set forth in the accompanying drawings and the description below. Other features, objects, and advantages will be apparent from the description and drawings, and from the claims.

DETAILED DESCRIPTION

Figure 1:
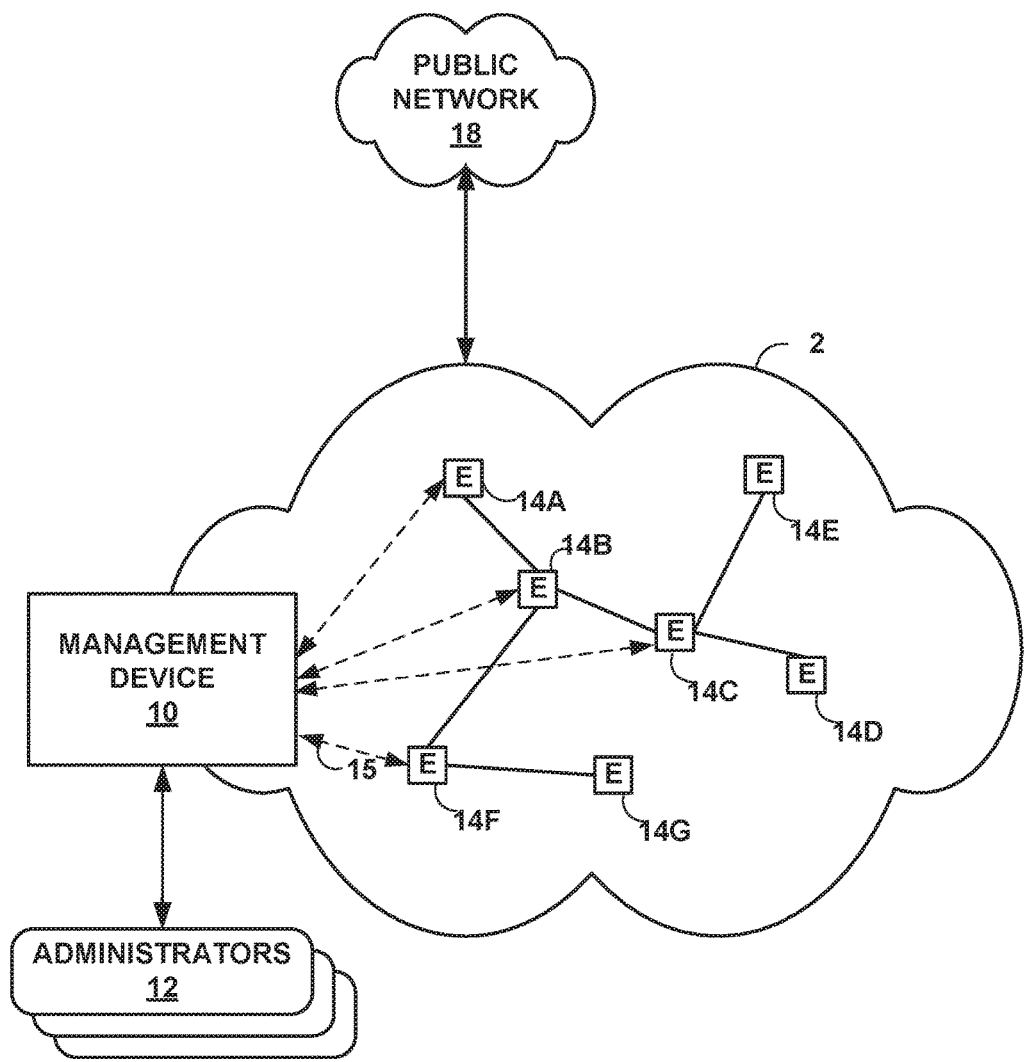
FIG. 1 is a block diagram illustrating an example including elements of an enterprise network that are managed using a management device.

FIG. 1 is a block diagram illustrating an example including elements of an enterprise network 2 that are managed using a management device 10. Managed elements 14A-14G (collectively, "elements 14") of enterprise network 2 include network devices interconnected via communication links to form a communication topology in order to exchange resources and information. Elements 14 (also generally referred to as network devices or remote network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 14 may be physical links (e.g., optical, copper, and the like), wireless, or any combination thereof.

Enterprise network 2 is shown coupled to public network 18 (e.g., the Internet) via a communication link. Public network 18 may include, for example, one or more client computing devices. Public network 18 may provide access to web servers, application servers, public databases, media servers, end-user devices, and other types of network resource devices and content.

Management device 10 is communicatively coupled to elements 14 via enterprise network 2. Management device 10, in some examples, forms part of a device management system, although only one device of the device management system is illustrated for purpose of example in FIG. 1.

Management device 10 may be coupled either directly or indirectly to the various elements 14. Once elements 14 are deployed and activated, administrators 12 uses management device 10 (or multiple such management devices) to manage the network devices using a device management protocol. One example device protocol is the Simple Network Management Protocol (SNMP) that allows management device 10 to traverse and modify management information bases (MIBs) that store configuration data within each of managed elements 14. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference.

In common practice, management device 10, also referred to as network management system (NMS) or NMS device, and elements 14 are centrally maintained by an IT group of the enterprise. Administrators 12 interacts with management device 10 to remotely monitor and configure elements 14. For example, administrators 12 may receive alerts from management device 10 regarding any of elements 14, view configuration data of elements 14, modify the configurations data of elements 14, add new network devices to enterprise network 2, remove existing network devices from enterprise network 2, or otherwise manipulate the enterprise network 2 and network devices therein. Although described with respect to an enterprise network, the techniques of this disclosure are applicable to other network types, public and private, including LANs, VLANs, VPNs, and the like.

In some examples, administrators 12 uses management device 10 or a local workstation to interact directly with elements 14, e.g., through telnet, secure shell (SSH), or other such communication sessions. That is, elements 14 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 15 with one of elements 14, e.g., element 14F, using management device 10, to directly configure element 14F. In this manner, a user can provide commands in a format for execution directly to elements 14.

Further, administrators 12 can also create scripts that can be submitted by management device 10 to any or all of elements 14. For example, in addition to a CLI interface, elements 14 also provide interfaces for receiving scripts that specify the commands in accordance with a scripting language. In a sense, the scripts may be output by management device 10 to automatically invoke corresponding remote procedure calls (RPCs) on the managed elements 14. The scripts may conform to, e.g., extensible markup language (XML) or another data description language.

Administrators 12 uses management device 10 to configure elements 14 to specify certain operational characteristics that further the objectives of administrators 12. For example, administrators 12 may specify for an element 14 a particular operational policy regarding security, device accessibility, traffic engineering, quality of service (QoS), network address translation (NAT), packet filtering, packet forwarding, rate limiting, or other policies. Management device 10 uses one or more network management protocols designed for management of configuration data within managed network elements 14, such as the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741, December 2006, available at tools.ietf.org/html/rfc4741. Management device 10 may establish NETCONF sessions with one or more of elements 14.

Management device 10 may be configured to compare a new set of high-level configuration data to an existing (or old) set of high-level configuration data, and apply the translation functions to the differences between the new and old high-level configuration data. In particular, management device 10 determines whether the new set of configuration data includes any additional configuration parameters relative to the old set of high-level configuration data, as well as whether the new set of configuration data modifies or omits any configuration parameters that were included in the old set of high-level configuration data.

Expressed another way, let the number of types of managed devices (e.g., types of elements 14) be represented by N, let the variable y represent low-level, device-specific configuration data, and let the variable x represent high-level configuration data. Management device 10 includes N translation functions $f_1(\ ), f_2(\ ), \ldots f_N(\ )$. These functions are configured accept the high-level configuration data (which may be expressed as structured input parameters, e.g., according to YANG, which is described in Bjorklund, "YANG—A Data Modeling Language for the Network Configuration Protocol (NETCONF)," Internet Engineering Task Force, RFC 6020, October 2010, available at tools.ietf.org/html/rfc6020). The functions are also configured to output respective sets of low-level device configuration data changes, e.g., device configuration additions and removals. That is, $y_1=f_1(x), y_2=f_2(x), \ldots y_N=f_N(x)$. Additional details regarding an example process for translating high level configuration information to low-level device configuration information can be found in, e.g., Jiang et al., "TRANSLATING HIGH-LEVEL CONFIGURATION INSTRUCTIONS TO LOW-LEVEL DEVICE CONFIGURATION," U.S. patent application Ser. No. 15/198,657, filed Jun. 30, 2016, the entire contents of which are hereby incorporated by reference.

In general, management device 10 maintains working drafts of candidate configurations to be applied to elements 14, prior to committing configuration changes to elements 14. In this manner, management device 10 maintains a private copy of a high level model (HLM) of configuration information, a low level model (LLM) of configuration information, and device raw configuration information for elements 14. Once a draft of configuration information is committed to the network, management device 10 may persist the HLM and LLM changes in an application data store. There may be multiple levels of service abstractions. For example, there may be higher-level services, base service elements, and the like.

Further, as discussed below, management device 10 may receive multiple configuration changes for a common element or set of elements 14 from different administrators 12. Such multiple configuration changes may be referred to as parallel changes. Management device 10, by applying the techniques of this disclosure, may address certain issues regarding handling parallel private data stores and service transactions. Such issues include conflict detection and resolution. Conflict detection and resolution includes the issue of ensuring data consistency. Management device 10 may support multiple parallel private data stores across HLMs and LLMs. When a high-level service is edited in parallel (generating multiple drafts of the configuration to be applied to elements 14), management device 10 may detect and resolve conflicts across the drafts to bring the consistency across layers.

Suppose, for example, one of administrators 12 edits an HLM instance. The "change" alone is not necessarily sufficient to detect a conflict. The transformation process from HLM to LLM may use some additional properties to transform the changes. Management device 10 may handle conflicts arising from this process and automatically resolve the conflicts to ensure consistency.

In particular, two or more of administrators 12 may provide new high-level configuration for one or more of elements 14. For example, a first one of administrators 12 may provide a first high-level configuration for one or more of elements 14 to management device 10, and a second one of administrators 12 may provide a first high-level configuration for one or more of elements 14 to management device 10. Thus, management device 10 may receive two different sets of high-level configuration separately from two different administrators 12.

Management device 10 may further determine respective sets of differences between the received high-level configuration and the existing high-level configuration. That is, management device 10 may determine a first set of differences between the existing high-level configuration for one or more of elements 14 and a first received high-level configuration for elements 14, and determine a second set of differences between the existing high-level configuration for one or more of elements 14 and a second received high-level configuration for elements 14.

Management device 10 may then translate the first set of differences to a first low-level configuration modification for one or more of elements 14, and translate the second set of differences to a second low-level configuration modification for one or more of elements 14. Management device 10 may further resolve any conflicts between the first low-level configuration modification and the second low-level configuration modification, e.g., by merging the first low-level configuration modification and the second low-level configuration modification. Management device 10 may then apply the merged low-level configuration modification to low-level configuration of the one or more of elements 14.

Using the techniques of this disclosure, management device 10 may also address issues concerning a configuration commit. In general, the configuration commit is the process of actually changing configuration information of one or more of elements 14. In general, management device 10 may lock one or more of elements 14 only when configuration is being committed to the one or more of elements 14. This locking may allow parallel service commits. Furthermore, out of band (OOB) changes may be allowed when a service transaction is in progress. Thus, management device 10 may permit OOB changes, rather than blocking the OOB changes during an entire transaction. Moreover, management device 10 may support command line interface (CLI) instructions for applying configuration changes.

Management device 10 may support the following transaction properties to support service provisioning. Management device 10 may ensure atomicity across one or more of elements 14 for service configuration. That is, if management device 10 is to apply configuration changes to one of elements 14, management device 10 applies either all of the configuration changes or none of the configuration changes. Management device 10 may also ensure consistency for each of elements 14 such that configuration information applied to elements 14 is valid. But Eventual consistency is sufficient across elements 14, as a NM Application would already provide strong consistency for the service view. The NM Application also maintains the raw configuration of the devices. Management device 10 may further isolate transactions to elements 14, which may preserve transaction integrity to support concurrent transactions among various elements 14. Moreover, management device 10 may support durability of configuration across each of elements 14.

Management device 10 may provide private configuration storage support across the NM HLM, LLM, and network device configuration models. There may be multiple private configuration stores operating in parallel. If management device 10 creates one or more private data stores with another HLM change, management device 10 may generate the LLM model and Device Native configuration changes. Then management device 10 may validate this "private data store" with existing private data stores. If the changes to part of this store conflict with any other store, then management device 10 may resolve the conflicts before committing the private data store to elements 14.

Management device 10 may commit the private data store to elements 14 in an atomic way. Management device 10 may select sets of differences for all elements 14 in the private data store and commit configuration information changes corresponding to the differences in parallel to elements 14.

Furthermore, management device 10 may provide support for rolling back the private data store. While the private Data store is being committed to elements 14, the commits can fail. For example, if the commit happens on three devices and it fails on fourth device, then management device 10 may calculate the negative difference for the fourth device and apply this negative difference to the first three devices. Management device 10 may not just generate the negative difference with a V1 object and the difference. There can be other OOB changes/other service changes committed to the devices. In this example, management device 10 may maintain changes that happen OOB to elements 14 (device configuration changes).

For example, suppose the original version of the configuration information is V1, and the private data store is updated to V2. After that, one of elements 14 is updated to V3 and subsequently V4. So the negative difference should not be directly calculated based on V1 and V2, as it will remove the changes of V3 and V4. Accordingly, management device 10 may apply the negative difference that would not conflict with the V3 and V4 changes.

This approach may provide complete transaction properties, while provisioning to the network. That is, Atomicity is provided; strict consistency is provided per device (eventual consistency is provided across the devices from the service operation point of view); isolation across transactions is already taken care at application layer, with private data store; and durability is already provided.

Figure 2:
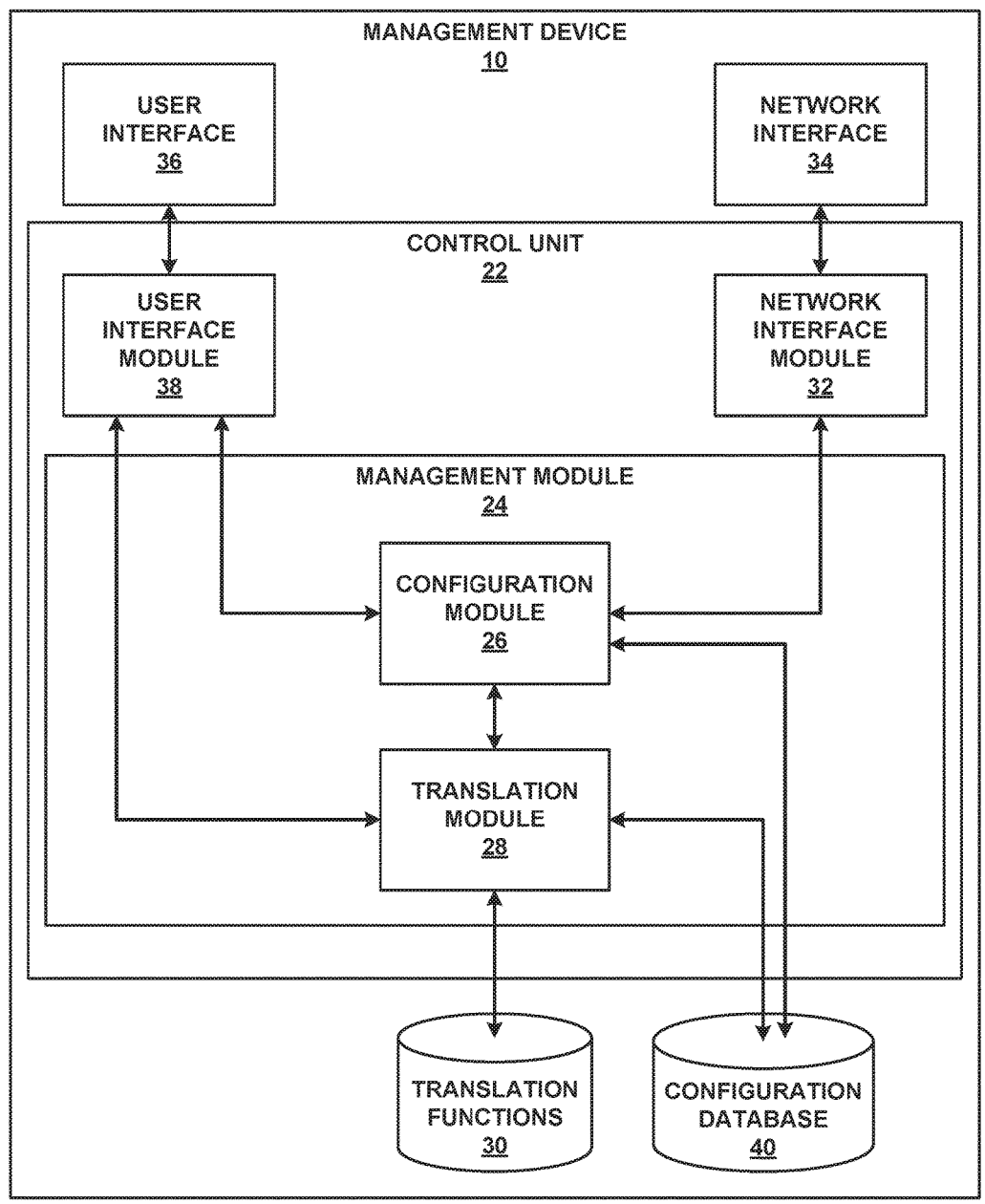
FIG. 2 is a block diagram illustrating an example set of components for the management device of FIG. 1.

FIG. 2 is a block diagram illustrating an example set of components for management device 10 of FIG. 1. In this example, management device 10 includes control unit 22, network interface 34, and user interface 36. Network interface 34 represents an example interface that can communicatively couple network device 20 to an external device, e.g., one of elements 14 of FIG. 1. Network interface 34 may represent a wireless and/or wired interface, e.g., an Ethernet interface or a wireless radio configured to communicate according to a wireless standard, such as one or more of the IEEE 802.11 wireless networking protocols (such as 802.11 a/b/g/n or other such wireless protocols). Management device 10 may include multiple network interfaces in various examples, although only one network interface is illustrated for purposes of example.

Control unit 22 represents any combination of hardware, software, and/or firmware for implementing the functionality attributed to control unit 22 and its constituent modules and elements. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 36 represents one or more interfaces by which a user, such as administrators 12 (FIG. 1) interacts with management device 10, e.g., to provide input and receive output. For example, user interface 36 may represent one or more of a monitor, keyboard, mouse, touchscreen, touchpad, trackpad, speakers, camera, microphone, or the like. Furthermore, although in this example management device 10 includes a user interface, it should be understood that administrators 12 need not directly interact with management device 10, but instead may access management device 10 remotely, e.g., via network interface 34.

In this example, control unit 22 includes user interface module 38, network interface module 32, and management module 24. Control unit 22 executes user interface module 38 to receive input from and/or provide output to user interface 36. Control unit 22 also executes network interface module 32 to send and receive data (e.g., packets) via network interface 34. User interface module 38, network interface module 32, and management module 24 may again be implemented as respective hardware units, or in software or firmware, or a combination thereof.

Functionality of control unit 22 may be implemented as one or more processing units in fixed or programmable digital logic circuitry. Such digital logic circuitry may include one or more microprocessors, digital signal processors (DSPs), application specific integrated circuits (ASICs), field programmable gate arrays (FPGAs), or any other equivalent integrated or discrete logic circuitry, as well as any combination of such components. When implemented as programmable logic circuitry, control unit 22 may further include one or more computer readable storage media storing hardware or firmware instructions to be executed by processing unit(s) of control unit 22.

Control unit 22 executes management module 24 to manage various network devices, e.g., elements 14 of FIG. 1. Management includes, for example, configuring the network devices according to instructions received from a user (e.g., administrators 12 of FIG. 1) and providing the user with the ability to submit instructions to configure the network devices. In this example, management module 24 further includes configuration module 26 and translation module 28.

Management module 24 is configured to receive high-level configuration instructions for a set of managed network devices from a user, such as administrators 12. Over time, the user may update the configuration instructions, e.g., to add new services, remove existing services, or modify existing services performed by the managed devices. The high-level instructions may be structured according to, e.g., YANG. In some examples, management module 24 also provides the user with the ability to submit translation functions that translation module 28 executes to transform high-level configuration instructions to device-specific, low-level configuration instructions, as discussed below.

Management device 10 also includes configuration database 40. Configuration database 40 generally includes information describing managed network devices, e.g., elements 14. For example, configuration database 40 may include information indicating device identifiers (such as MAC and/or IP addresses), device type, device vendor, devices species (e.g., router, switch, bridge, hub, etc.), or the like. Configuration database 40 also stores current configuration information (e.g., high-level configuration information, or in some cases, both high-level configuration and low-level configuration information) for the managed devices (e.g., elements 14). In accordance with the techniques of this disclosure, configuration database 40 may include one or more sets of public or private HLM configuration, LLM configuration, and/or device level configuration.

Translation module 28 determines which of translation functions 30 to execute on the high-level configuration instructions based on the information of configuration database 40, e.g., which of the devices are to receive the low-level configuration instructions. Translation module 28 then executes each of the determined translation functions of translation functions 30, providing the high-level configuration instructions to the translation functions as input and receiving low-level configuration instructions.

Configuration module 26 may first determine an existing set of high-level configuration information for each service performed by the devices for which configuration is to be updated, e.g., by retrieving the existing set of high-level configuration information for each of the services from configuration database 40. Configuration module 26 may then compare the existing set of high-level configuration information to the newly received set of high-level configuration information, and determine differences between the existing and newly received sets of high-level configuration information. Configuration module 26 may then pass these differences to translation module 28, for translation into respective sets of low-level configuration information. Configuration module 26 also updated the existing high-level configuration information recorded in configuration database 40 based on the newly received set of high-level configuration information.

As discussed above, a user, such as administrators 12, may create different translators for data creation, data updates, and data deletions. This disclosure describes translation techniques based on an appreciation that an "update translator" needs to check modified variables in the high-level configuration information, and update the corresponding configuration in the low-level configuration model(s). When updating the low-level configuration information, the translator should not only rely on the high-level difference data, because unchanged data of the high-level configuration data may need to be read to properly change the low-level configuration data. Thus, the techniques of this disclosure may simplify update and/or delete translators for translating high-level configuration data to low-level configuration data. In some examples, the "create" translator may be used to perform update and/or deletion translations as discussed below.

In some examples, translation functions 30 that perform update translations (that is, translating changes in high-level configuration data that results in updates to values of low-level configuration information, without creation or deletion of elements in the low-level configuration data) may operate as follows. In one example, the translation functions 30 that perform updates may override single elements. That is, performance of these translation functions may result in deletion of an element value, e.g., by replacing an old element value with a new value. Sometimes, a single value in a configuration service model can be mapped to a list in a device configuration. In these cases, translation module 28 may send the old value as well as the new value.

For example, a leaf element in a high-level model (HLM) may be mapped to a list of elements in a low-level model (LLM) for device-level configuration information. Suppose the HLM element has the name "VLAN name" but in LLM, the corresponding element is named "list." If a user modifies the HLM object by replacing the name "VLAN name" with a new name (e.g., "new VLAN name"), the translation function would need to delete "VLAN name," otherwise a stale entry would be retained in the lower-level configuration information. Moreover, translation functions 30 that perform updates may cause translation module 28 to update lists by adding new entries as needed, and deleting old entries.

Translation module 28 (which may be configured according to translation functions 30) may use the same translation template for creation, updates, and deletion of high-level configuration instructions. Translation module 28 may be configured to allow processing of only impacted high level data changes (i.e., those elements in the high-level configuration information that are impacted by the changes). Based on the translator logic, translation module 28 may infer dependencies across HLM elements in the high-level model, and the corresponding LLM elements. When the high-level configuration information is changed, translation module 28 may generate a difference between existing high-level configuration information and new high-level configuration information. This difference may account for the dependencies in the LLM elements. Thus, when calculating the difference, translation module 28 may determine the difference as well as information used to process the difference, e.g., based on the dependencies. Translation module 28 may execute one of translation functions 30, providing the determined information (differences and dependencies) to the executed one of translation functions 30 as input.

When a "create" template is uploaded (that is, a translation function of translation functions 30 that processes new data in high-level configuration information, relative to existing high-level configuration information), translation module 28 may determine the dependencies across elements within the high-level configuration information. These dependencies may be based on service-to-device configuration mappings. When the service is changed, translation module 28 may generate a difference between the existing high-level configuration information and the new high-level configuration information, based on the dependencies. Translation module 28 may then use the "create" template (the translation function of translation functions 30) to process the difference, and thereby translate the high level configuration information to low-level configuration instructions. Translation module 28 may then provide the low-level configuration instructions to configuration module 28.

After receiving the low-level configuration instructions from translation module 28, configuration module 28 sends the low-level configuration instructions to respective managed network devices for which configuration is to be updated via network interface module 32. Network interface module 32 passes the low-level configuration instructions to network interface 34. Network interface 34 forwards the low-level configuration instructions to the respective network devices.

Although user interface 36 is described for purposes of example as allowing administrators 12 (FIG. 1) to interact with management device 10, it should be understood that other interfaces may be used in other examples. For example, management device 10 may include a representational state transfer (REST) client (not shown) that may act as an interface to another device, by which administrators 12 may configure management device 10. Likewise, administrators 12 may configure elements 14 by interacting with management device 10 through the REST client.

In accordance with the techniques of this disclosure, user interface 36 and/or network interface 34 may receive a plurality of high level configuration data sets in parallel (that is, before the high level configuration has been committed to elements 14 of FIG. 1) from multiple administrators 12. Configuration module 26 may be configured to determine separate sets of differences for each of the received high level configuration data sets relative to an existing high level configuration for elements 14 as stored in configuration database 40. Configuration module 26 may further store each of the received high level configuration data sets in separate portions of configuration database 40, in particular, in private storage of configuration database 40.

Translation module 28 may translate each of the sets of differences to low level configuration modification data sets using translation functions 30. Management module 24 may then determine whether there are conflicts between the low level configuration modification data sets. If such conflicts exist, management module 24 may attempt to mitigate the conflicts, e.g., by merging the multiple sets of low level configuration modification data sets.

Management module 24 may then apply the merged set of low level configuration modification to one or more of elements 14 via network interface 34. In particular, when applying the low level configuration, management module 24 may lock one of elements 14 for which the low level configuration is to be updated, apply the low level configuration modification to the locked one of elements 14, then immediately unlock the locked one of elements 14, and proceed through each of elements 14 in similar fashion. Moreover, management module 24 may determine whether the change was effective. If the change was effective, management module 24 may proceed to apply the low level configuration modification to a next one of elements 14 (e.g., by locking the next one of elements 14, applying the low level configuration modification, and then unlocking the next one of elements 14).

On the other hand, if the low level configuration modification was not successful, management module 24 may roll back the low level configuration modification for each of elements 14 to which the modification was applied. In particular, configuration module 26 may calculate a set of differences between the new high level configuration and the previous high level configuration (referred to herein as a set of "negative differences"), then send the set of negative differences to translation module 26. Translation module 26 may then apply one or more of translation functions 30 to the set of negative differences to translate the negative differences to negative low level configuration modifications. Translation module 28 may store the negative low level configuration modifications to configuration database 40, and management module 24 may apply the negative low level configuration modifications to each of elements 14 to which the merged low level configuration modifications had been applied.

In this manner, management device 10 of FIGS. 1 and 2 represents an example of a NMS device that manages a plurality of network devices, the NMS device comprising a first interface configured to receive high-level configuration for the plurality of network devices, a second interface configured to communicate low-level configuration to the plurality of network devices, and one or more processing units, implemented using digital logic circuitry, configured to determine a first set of differences between an existing high-level configuration for the plurality of network devices and a first received high-level configuration, received via the first interface, for the plurality of network devices, determine a second set of differences between the existing high-level configuration for the plurality of network devices and a second received high-level configuration, received via the first interface, for the plurality of network devices, wherein the second received high-level configuration is received separately from the first received high-level configuration, translate the first set of differences to a first low-level configuration modification for the plurality of network devices, translate the second set of differences to a second low-level configuration modification for the plurality of network devices, merge the first low-level configuration modification and the second low-level configuration modification to produce a merged low-level configuration modification, and apply, via the second interface, the merged low-level configuration modification to low-level configuration of the plurality of network devices.

Figure 3:
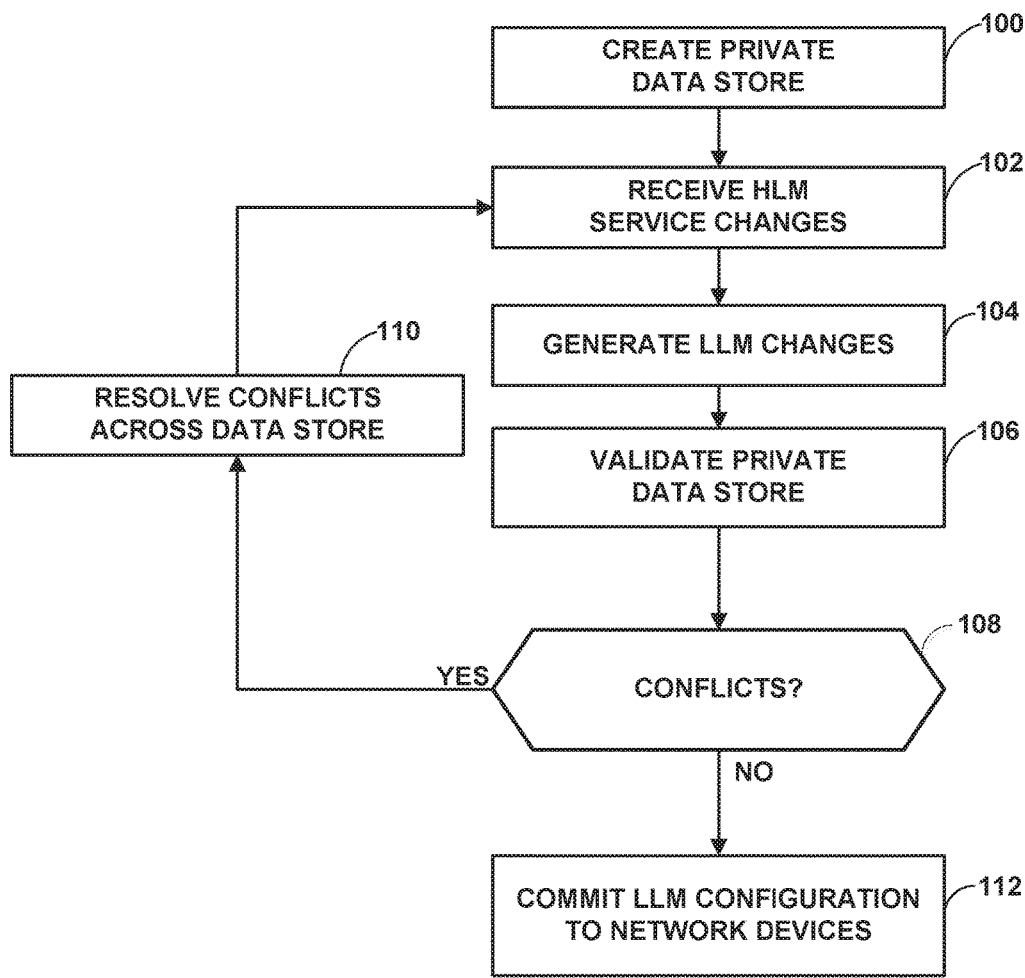
FIG. 3 is a flowchart illustrating an example method for creating a private data store in accordance with the techniques of this disclosure.

FIG. 3 is a flowchart illustrating an example method for creating a private data store in accordance with the techniques of this disclosure. Components of management device 10 of FIGS. 1 and 2 may perform this method, in this example. The private data store contains the deltas of all high-level services and low-level services.

Initially in this example, configuration module 26 of management module 24 creates a private data store within configuration database 40 (100). Configuration module 26 of management module 24 may store, for example, an existing set of high level configuration, an existing set of low level configuration, and an existing set of device level configuration to the private data store.

Management device 10 may then receive multiple HLM service changes (102), e.g., from two or more administrators 12 via user interface 36 and/or network interface 34. Configuration module 26 of management module 24 may provide the HLM service changes to translation module 28, to cause translation module 28 to generate LLM changes from the HLM service changes (104) using translation functions 30. Translation module 28 may then store each of the LLM changes to the private data store of configuration database 40.

Management module 24 may then validate the private data store (106). That is, management module 24 may determine whether any of the LLM changes from the various received HLM changes result in a conflicting change (e.g., two or more changes to the same element or node of low level configuration) (108). If there are conflicts ("YES" branch of 108), management module 24 may resolve the conflicts across the private data store, e.g., by merging the sets of LLM changes. In some cases, resolution of the conflicts may require additional information from one or more of administrators 12, in which case administrators 12 may provide additional HLM service changes (102).

If no conflicts have arisen or once all conflicts have been resolved ("NO" branch of 108), management module 24 may commit the LLM configuration to the corresponding managed devices (112), e.g., one or more of elements 14.

When a high-level service is edited, the "change" alone would not be sufficient to detect the conflict. The Transformation process may involve some additional properties to transform the changes. Management device 10 may use a dependency map to generate the dependency delta that will be used to detect the additional properties to handle the change. When the high level service is changed, management device 10 may generate the additional properties based on the dependency map and keep these additional properties in the private data store. Management device 10 may use these additional properties to detect the conflict.

The following is an example configuration update:
{
   "p2p-ethernet": {
     "service-type": "p2p ethernet",
     "service-name": "Service_1",
     "connectivity-settings": {
       "mtu": "1000"
       "@operation": "update",
     }
   }
}

The additional dependency information would be
{
   "p2p-ethernet": {
     "service-type": "p2p ethernet",
     "endpointA": {
       "pe-device": "1000",
       "uni-interface": "ge-0/1/1",
     },
     "endpointZ": {
       "pe-device": "1000",
       "uni-interface": "ge-0/1/1",
     },
     "service-name": "Service_1",
   }
}

One more draft is created with
{
   "p2p-ethernet": {
     "service-type": "p2p ethernet",
     "endpointA": {
       "pe-device": "1000",
       "uni-interface": "ge-0/1/2",
       "@operation": "update",
     },
}

Here, both the drafts do not have a direct conflict. But transformation would detect this conflict to bring data consistency. If a new draft is created including this dependent information included, management device 10 automatically detects the change and suggests the solution. In the example above, the resolution would be merging both the drafts.

In this manner, the method of FIG. 3 represents an example of a method performed by a NMS device, the method including determining a first set of differences between an existing high-level configuration for the plurality of network devices and a first received high-level configuration for the plurality of network devices, determining a second set of differences between the existing high-level configuration for the plurality of network devices and a second received high-level configuration for the plurality of network devices, wherein the second received high-level configuration is received separately from the first received high-level configuration, translating the first set of differences to a first low-level configuration modification for the plurality of network devices, translating the second set of differences to a second low-level configuration modification for the plurality of network devices, merging the first low-level configuration modification and the second low-level configuration modification to produce a merged low-level configuration modification, and applying the merged low-level configuration modification to low-level configuration of the plurality of network devices.

Figure 4:
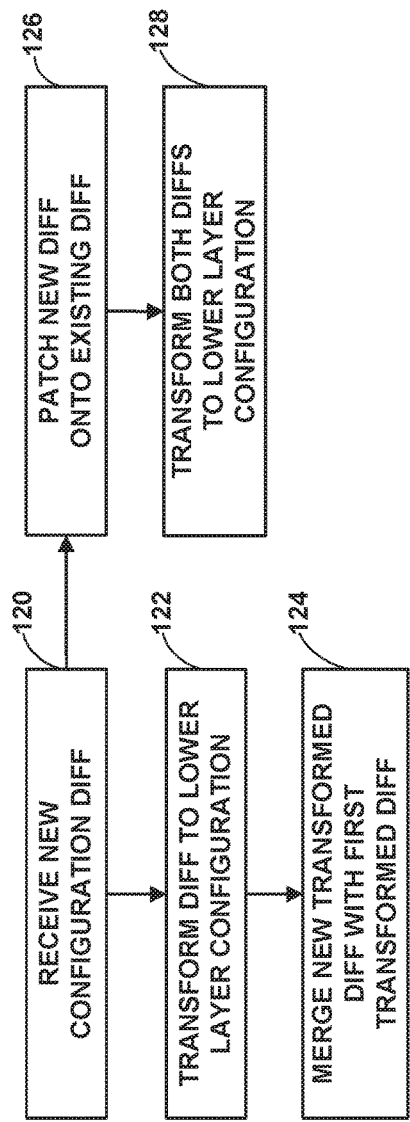
FIG. 4 is a flowchart illustrating an example method for providing support for patching on drafts in accordance with the techniques of this disclosure.

FIG. 4 is a flowchart illustrating an example method for providing support for patching on drafts in accordance with the techniques of this disclosure. As noted above, the techniques of this disclosure include determining two sets of differences between respective sets of new HLM configuration and an existing HLM configuration. In other examples, management device 10 may append one of the sets of differences to the other set of differences, and translate the combined set of differences. In still other examples, the techniques of this disclosure include translating two sets of HLM differences to respective sets of LLM changes, then merging the two sets of LLM changes.

Thus, in the example of FIG. 4, after configuration module 26 determines a first set of differences between a first new HLM configuration and existing HLM configuration, configuration module 26 receives a new, second set of differences between a second new HLM configuration and the existing HLM configuration (120). Then, in one example, translation module 28 may translate the second set of differences to a LLM configuration change (122). Translation module 28 may then merge the second LLM configuration change from the second set of differences with the first LLM configuration change from the first set of differences (124). In this manner, translation module 28 may translate both a first LLM configuration change (resulting from translating a difference between a first HLM configuration and an existing HLM configuration) and a second LLM configuration change (resulting from translating a difference between a second HLM configuration and the existing HLM configuration), and then merge the second LLM configuration change with the first LLM configuration change.

In an alternative example, configuration module 26 may patch the second set of differences into the first set of differences (126), and then translation module 28 may translate both sets of differences to LLM configuration changes (128).

In one example, management device 10 creates a new P2P Ethernet service as part of a draft. The draft is yet to be deployed. One of administrators 12 then adds firewall settings as part of the P2P service. Management device 10 then transforms only the additional differences, which came in as part of the patch, and merges the additional diffs at each layer with the existing differences. This approach saves management device 10 from the burden of transferring the whole configuration difference every time a small incremental change is made on top of the existing configuration change.

In this example, a difference (delta) in the draft would be:
diff1={
  "connectivity-settings": {
    "interface": {
      "name": "ge-0/0/1",
      "operation": "create"
    }
  }
}

The below patch has been applied on the draft:
"connectivity-settings": {
  "interface": {
    "name": "ge-0/0/1",
    "oper-status": {
      "@value": "up",
      "operation": "create"
    }
  }
}

It will become:
{
  "connectivity-settings": {
    "interface": {
      "name": "ge-0/0/1",
      "oper-status":"up"
      "operation": "create"
    }
  }
}

Tables 1-3 below summarize the Patch algorithm on Draft.

TABLE 1

Parent Node state in existing difference

| | Add | Update | Delete |
|---|---|---|---|
| Node - Add | NA | Allowed. Node operation will be Add. Parent state will be Update | NA |
| Node - Update | Allowed. Parent state will be Add, and node operation will be removed. | Allowed. Node operation will be Update. Parent state will be Update | NA |
| Node - Delete | Allowed. Remove node entry from existing diff. | Allowed. Node operation will be delete. Parent state will be Update | NA |

TABLE 2

Child Node state in existing difference

| | Add | Update | Delete |
|---|---|---|---|
| Node - Add | NA | NA | NA |
| Node - Update | Allowed. Child state will be Add, and node operation will be update and delta would be merged. | Allowed. Child Node operation will be Update. and node operation will be update and delta would be merged. | Allowed. Child Node operation will be delete. and node operation will be update and delta would be merged. |
| Node - Delete | Allowed. Remove Child node entry from existing diff. Node operation will be delete. | Allowed. Remove Child node entry from existing diff. Node operation will be delete. | Allowed. Remove Child node entry from existing diff. Node operation will be delete. |

TABLE 3

Same Node state in existing difference

|  | Add | Update | Delete |
|---|---|---|---|
| Node - Add | NA | NA | NA |
| Node - Update | Allowed. Node state will be Add and update the contents | Allowed. Node operation will be Update and update the contents in existing diff. | NA |
| Node - Delete | Allowed. Remove node entry from existing diff. | Allowed. Node operation will be delete and delete the contents from the existing diff. | NA |

Management device 10 may perform database-agnostic transaction management. That is, management device 10 may maintain every change as a snapshot as part of the private data store. While creating a draft, a draft manager makes sure that there are no two drafts with conflicting changes. So locks will not be required during commits of the private configuration to the database.

When a service part of a draft is committed to all its endpoints, management device 10 may commit the configuration to multiple data stores. For example, management device 10 may push the configuration to the device (one of elements 14) and to the application data store. In conventional solutions, all the devices that are part of the services in the draft and also the data base resources are locked for the entire duration of the draft commit. But here, management device 10 locks a device (e.g., one of elements 14) just while pushing the configuration to it and then immediately unlocks the device. In case of the application database, the resources are never locked, because no two running drafts can have conflicting changes.

A typical configuration change is represented in the example below. Here for the edit and delete scenarios, the snapshot of the existing values is captured as shown below.

```
{
  "connectivity-settings": {
    "interface": [
      {
        "name": "ge-0/0/1",
        "oper-status": {
          "@value": "up",
          "@snapshot": "down", // Snapshot of the existing value
          "@operation": "update",
        },
        "admin-status": {
          "@value": "up",
          "operation": "create"
        }
      },{
        "name": "ge-0/0/2",
        "oper-status": "up",
        "admin-status": "up", // Existing values of interface ge-0/0/2
        "@operation": "delete"
      }
    ]
  }
}
```

In the case that the transaction fails, the configuration pushed to the application database will be reverted with the negated change generated from the private data store. An example of the negated change corresponding to the example configuration above is given below.

```
{
  "connectivity-settings": {
    "interface": [
      {
        "name": "ge-0/0/1",
        "oper-status": {
          "@value": "down",
          "@snapshot": "up", // @snapshot and @value are swapped
          "@operation": "update",
        },
        "admin-status": {
          "@value": "up",
          "operation": "delete"
        }
      },{
        "name": "ge-0/0/2",
        "oper-status": "up",
        "admin-status": "up",
        "@operation": "create" // @operation is changed to 'create'
      }
    ]
  }
}
```

Figure 5:
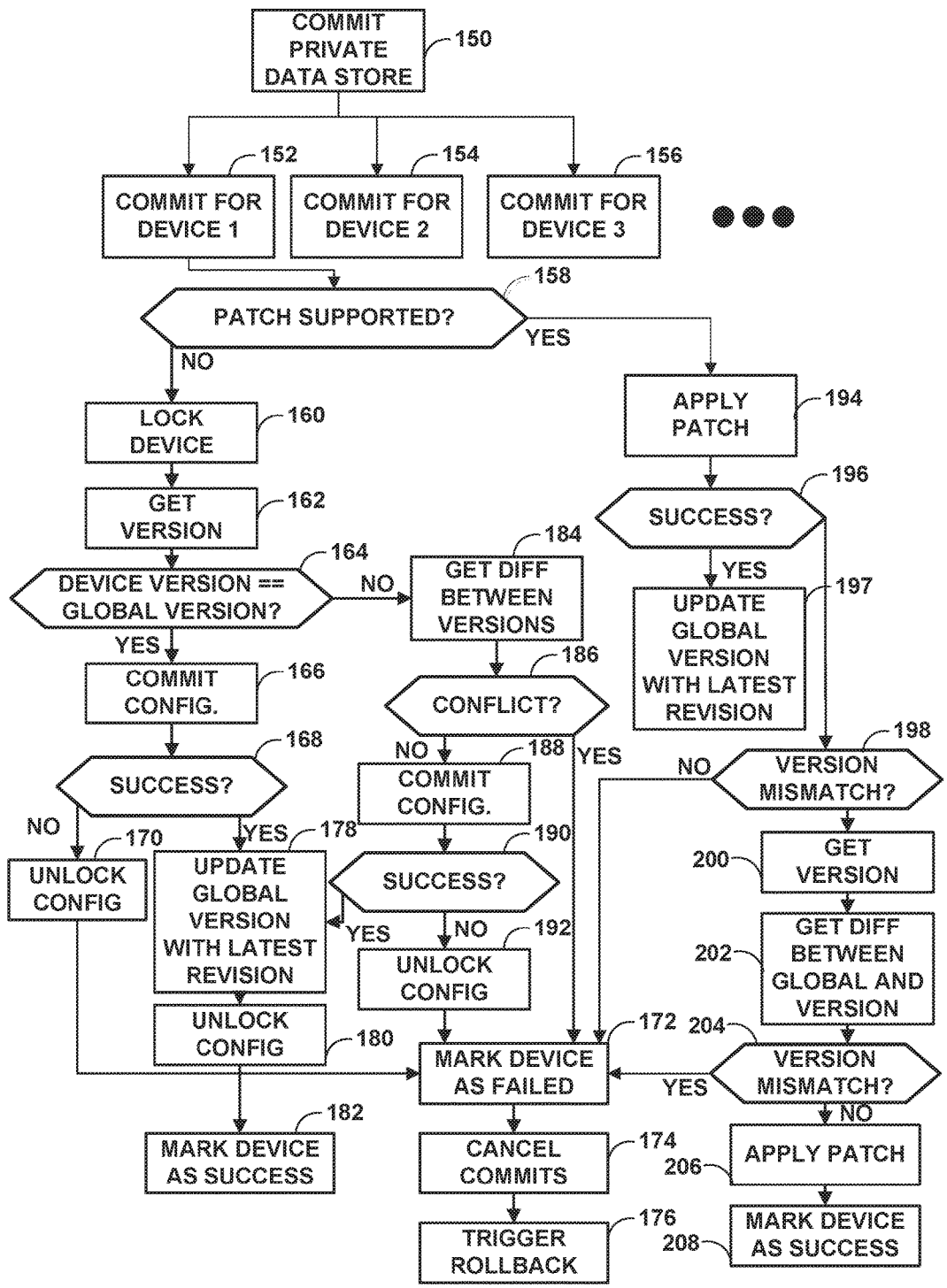
FIG. 5 is a flowchart illustrating an example commit method in accordance with the techniques of this disclosure.

Management device 10 may perform the process described below to commit the private data store. In the following algorithm, prerequisites include that the network-wide private configuration will not have any conflicts with other private configuration, and that the configuration difference is calculated when the private configuration is created. The algorithm below represents the steps involved in device commits at a high level, which management device 10 may perform in accordance with the techniques of this disclosure:

For every device in "private data store"
  Apply patch to device
  If patch is successful
    Proceed for other devices.
  If patch is not successful
    If failed due to validation errors
      Rollback the devices in Private data store
    If failed because of version-change
      Check if the diff is un impacted due to OOB
        If yes, apply patch with new timestamp
          Else: Rollback the devices in Private data store
Function Rollback:
  For every device in "private data store"
    Check if the configuration in device is changed
    Get the original private diff
    If changed,
      Collect the diff from OOB changes
      Filter out configuration XPATHs which clash with OOB changes
      If the clashing OOB XPATH is part of a policy and is referred elsewhere, then all the policy attributes are filtered out from the private diff
      Calculate negative diff
      Apply negative diff FIG. 5 is a flowchart illustrating an example commit method in accordance with the techniques of this disclosure. In this example, it is assumed that management device 10 maintains a global device version value for every device. It is further assumed that management device 10 updates this value for every network management configuration "commit" operation. Management device 10 may further update the version information caused by out of band (OOB) changes when services are synchronized.

Initially, in this example, management module 24 receives a set of high level model (HLM) configuration to be committed to a set of elements 14. As discussed above, configuration module 26 determines differences between the received HLM configuration and existing HLM configuration, which translation module 28 translates to a set of LLM configuration modifications. Management module 24 stores the received HLM configuration and LLM configuration modifications to a private data store of configuration database 40. Management module 24 then receives an instruction to commit the private data store (150).

In response, management module 24 commits the LLM configuration modifications to each of the set of devices (152, 154, 156). In general, management module 24 may perform substantially the same method for each of the devices, as follows.

First, configuration module 26 of management module 24 may determine whether the current device supports a patch (158). If the device does not support a patch ("NO" branch of 158), configuration module 26 may lock the device (160). Configuration module 26 may then determine a version of the LLM configuration for the device (162). Configuration module 26 may then determine whether the version for the LLM configuration for the device is equal to the current global version for which the difference was calculated (164).

If the version for the LLM configuration for the device is equal to the global version ("YES" branch of 164), configuration module 26 proceeds to attempt to commit the new LLM configuration (166). Configuration module 26 then determines whether the commit was successful (168). If the commit was not successful ("NO" branch of 168), configuration module 26 unlocks the configuration of the device (170), marks the device as failed (172), cancels the commit for subsequent devices (174), and triggers a rollback (176). The rollback is explained in greater detail below with respect to FIG. 6. If the commit was successful ("YES" branch 168), however, configuration module 26 updates the global version for the device with the latest revision (178), unlocks the configuration (180), and marks the device as successful (182).

If the device version is not equal to the global version ("NO" branch of 164), configuration module 26 determines a difference between the device version and the global version (184). Configuration module 26 then determines whether there is a version mismatch between the two versions (186). If there is no version mismatch ("NO" branch of 186), configuration module 26 attempts to commit the configuration (188). Configuration module 26 then determines whether the commit was successful (190). If the commit was successful ("YES" branch of 190), configuration module 26 updates the global version for the device with the latest revision (178), unlocks the configuration (180), and marks the device as successful (182). However, if the commit was not successful, configuration module 26 unlocks the configuration (192) and marks the device as failed (172) as discussed above.

If instead the device does support a patch ("YES" branch of 158), configuration module 26 applies the patch (194). Configuration module 26 then determines whether the patch was successful (196). If the patch was successful ("YES" branch of 196), configuration module 26 updates the global version for the device with the latest revision value (197).

If the patch was not successful ("NO" branch of 196), configuration module 26 may determine whether the failure was due to a version mismatch (198). If the failure was due to something other than a version mismatch (e.g., validation) ("NO branch of 198), configuration module 26 may mark the device as failed (172) and proceed to cancel further commits (174) and trigger a rollback (176) as discussed above.

However, if the failure was due to a version mismatch ("YES" branch of 198), configuration module 26 determines a version for the current configuration (200). Configuration module 26 then determines a difference between the global configuration version and the version for the current configuration (202). Configuration module 26 then again determines whether there is a version mismatch between these versions (204). If there is a version mismatch ("YES" branch of 204), configuration module 26 may mark the device as failed as discussed above with respect to step 172, cancel further commits (174), and trigger a rollback as discussed above with respect to step 176. However, if there is no version mismatch version mismatch ("NO" branch of 204), configuration module 26 may apply the patch (206) and mark the device as successful (208).

Figure 6:
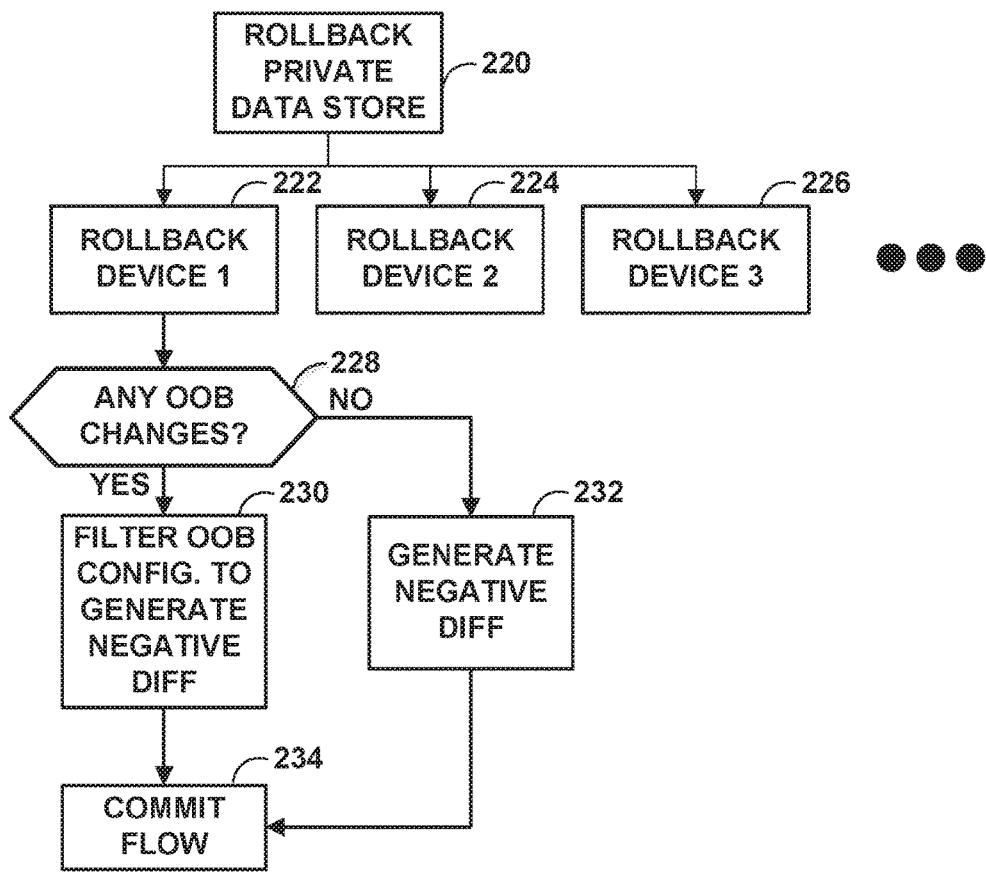
FIG. 6 is a flowchart illustrating an example rollback method in accordance with the techniques of this disclosure.

FIG. 6 is a flowchart illustrating an example rollback method in accordance with the techniques of this disclosure. Configuration module 26 may perform the rollback method of FIG. 6 in response to triggering a rollback as discussed with respect to step 176 of FIG. 5. It is presumed, with respect to the method of FIG. 6, that management module 24 maintains the history of changes and source of change for configuration changes (e.g., whether applied by management device 10 or an out of band change).

Initially, configuration module 26 triggers a rollback of the private data store (220). This step may correspond to step 176 of FIG. 5. In response, configuration module 26 rolls back each device to which the new configuration modifications have been applied, e.g., to device 1 (222), device 2 (224), and device 3 (226). Configuration module 26 may perform the following method for each device to which the new configuration has been applied.

Configuration module 26 may determine whether any out of band (OOB) changes have been made to the configuration for the device (228). If OOB changes have been made ("YES" branch of 228), configuration module 26 filters the OOB changes to generate a negative difference (230). On the other hand, if OOB changes have not been made ("NO" branch of 228), configuration module 26 generates the negative difference directly (232). In either case, configuration module 26 then commits a flow based on a translated version of the negative difference (234), where translation module 28 may translate the negative difference.

The techniques of this disclosure may be further expanded by batching device changes while committing the configuration. If the device starts supporting the version for container and List element level, the techniques of this disclosure may enable parallel commits to the device.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method performed by a network management system (NMS) device that manages a plurality of network devices, the method comprising:
   determining a first set of differences between an existing high-level configuration for the plurality of network devices and a first received high-level configuration for the plurality of network devices;
   determining a second set of differences between the existing high-level configuration for the plurality of network devices and a second received high-level configuration for the plurality of network devices, wherein the second received high-level configuration is received separately from the first received high-level configuration;
   translating the first set of differences to a first low-level configuration modification for the plurality of network devices;
   translating the second set of differences to a second low-level configuration modification for the plurality of network devices;
   merging the first low-level configuration modification and the second low-level configuration modification to produce a merged low-level configuration modification; and
   applying the merged low-level configuration modification to low-level configuration of the plurality of network devices.

2. The method of claim 1, wherein the first low-level configuration modification represents a first modification to a node of low-level configuration information for the plurality of network devices, and wherein the second low-level configuration modification represents a second modification to the node of the low-level configuration information for the plurality of network devices.

3. The method of claim 2, wherein when the first modification comprises adding the node and the second modification comprises updating a value for the node, merging comprises producing the merged low-level configuration modification to add the node such that the node has the value from the second modification.

4. The method of claim 2, wherein when the first modification comprises adding the node and the second modification comprises deleting the node, merging comprises producing the merged low-level configuration modification to omit addition of the node.

5. The method of claim 2, wherein when the first modification comprises updating an element of the node to a first value and the second modification comprises updating the element of the node to a second value, merging comprises producing the merged low-level configuration to update the element of the node to the second value.

6. The method of claim 2, wherein when the first modification comprises updating an element of the node and the second modification comprises deleting the node, merging comprises producing the merged low-level configuration to delete the node.

7. The method of claim 1, wherein the first low-level configuration modification represents a first modification to a parent node of low-level configuration information for the plurality of network devices, and wherein the second low-level configuration modification represents a second modification to a child node of the parent node of the low-level configuration information for the plurality of network devices.

8. The method of claim 1, wherein the first low-level configuration modification represents a first modification to a child node of low-level configuration information for the plurality of network devices, and wherein the second low-level configuration modification represents a second modification to a parent node of the child node of the low-level configuration information for the plurality of network devices.

9. The method of claim 1, wherein applying the merged low-level configuration modification comprises, for each of the plurality of network devices:
   locking the network device;
   applying the merged low-level configuration modification to the network device; and
   immediately after applying the merged low-level configuration modification to the network device, unlocking the network device.

10. The method of claim 9, further comprising preventing locking of one or more network devices of the plurality of network devices while applying the merged low-level configuration modification to a different network device of the plurality of network devices.

11. The method of claim 9, wherein locking the network device comprises locking the network device without locking the other network devices of the plurality of network devices.

12. The method of claim 1, further comprising performing concurrent service transactions without locking the network devices.

13. The method of claim 1, wherein applying the merged low-level configuration modification comprises:
   after applying the merged low-level configuration modification to the low-level configuration of a current network device of the plurality of network devices, determining whether the application of the merged low-level configuration modification was successful;

when application of the merged low-level configuration modification to the current network device was successful, applying the merged low-level configuration modification to the low-level configuration of a second network device of the plurality of network devices;

when application of the merged low-level configuration modification to the current network device was not successful, performing a roll-back of the low-level modification of previously modified network devices of the plurality of network devices.

14. The method of claim 13, wherein performing the roll-back comprises:
determining a set of negative differences between the second received high-level configuration and the existing high-level configuration;
translating the set of negative differences to a negative low-level configuration modification; and
applying the negative low-level configuration modification to each of the plurality of network devices to which the merged low-level configuration modification has been applied.

15. The method of claim 1,
further comprising:
storing the first received high-level configuration in a first private data store; and
storing the second received high-level configuration in a second, different private data store,
wherein translating the first set of differences comprises generating first dependency information and storing the first dependency information in the first private data store;
wherein translating the first set of differences comprises generating second dependency information and storing the second dependency information in the second private data store; and
wherein merging comprises merging based on the first dependency information from the first private data store and the second dependency information from the second private data store.

16. The method of claim 1,
wherein translating the first set of differences further comprises forming a first snapshot representing current values for elements changed by the first low-level configuration modification; and
wherein translating the second set of differences further comprises forming a second snapshot representing current values for elements changed by the second low-level configuration modification.

17. The method of claim 1, wherein applying the merged low-level configuration modification comprises maintaining a transaction during a commit of a private data store irrespective of whether the network devices support transactions.

18. A network management system (NMS) device that manages a plurality of network devices, the NMS device comprising:
a first interface configured to receive high-level configuration for the plurality of network devices;
a second interface configured to communicate low-level configuration to the plurality of network devices; and
one or more processing units, implemented using digital logic circuitry, configured to:
determine a first set of differences between an existing high-level configuration for the plurality of network devices and a first received high-level configuration, received via the first interface, for the plurality of network devices;
determine a second set of differences between the existing high-level configuration for the plurality of network devices and a second received high-level configuration, received via the first interface, for the plurality of network devices, wherein the second received high-level configuration is received separately from the first received high-level configuration;
translate the first set of differences to a first low-level configuration modification for the plurality of network devices;
translate the second set of differences to a second low-level configuration modification for the plurality of network devices;
merge the first low-level configuration modification and the second low-level configuration modification to produce a merged low-level configuration modification; and
apply, via the second interface, the merged low-level configuration modification to low-level configuration of the plurality of network devices.

19. The NMS device of claim 18, wherein the first low-level configuration modification represents a first modification to a node of low-level configuration information for the plurality of network devices, and wherein the second low-level configuration modification represents a second modification to the node of the low-level configuration information for the plurality of network devices.

20. The NMS device of claim 18, wherein the first low-level configuration modification represents a first modification to a parent node of low-level configuration information for the plurality of network devices, and wherein the second low-level configuration modification represents a second modification to a child node of the parent node of the low-level configuration information for the plurality of network devices.

21. The NMS device of claim 18, wherein the first low-level configuration modification represents a first modification to a child node of low-level configuration information for the plurality of network devices, and wherein the second low-level configuration modification represents a second modification to a parent node of the child node of the low-level configuration information for the plurality of network devices.

22. The NMS device of claim 18, wherein to apply the merged low-level configuration modification, the one or more processing units are configured to, for each of the plurality of network devices:
lock the network device;
apply the merged low-level configuration modification to the network device; and
immediately after applying the merged low-level configuration modification to the network device, unlock the network device.

23. The NMS device of claim 18, wherein the one or more processing units are configured to perform concurrent service transactions without locking the network devices.

24. The NMS device of claim 18, wherein to apply the merged low-level configuration modification, the one or more processing units are configured to:
after applying the merged low-level configuration modification to the low-level configuration of a current network device of the plurality of network devices, determine whether the application of the merged low-level configuration modification was successful;
when application of the merged low-level configuration modification to the current network device was successful, apply the merged low-level configuration modification to the low-level configuration of a second network device of the plurality of network devices; and when application of the merged low-level configuration modification to the current network device was not successful, perform a roll-back of the low-level modification of previously modified network devices of the plurality of network devices.

25. The NMS device of claim 24, wherein to perform the roll-back, the one or more processing units are configured to:
determine a set of negative differences between the second received high-level configuration and the existing high-level configuration;
translate the set of negative differences to a negative low-level configuration modification; and
apply the negative low-level configuration modification to each of the plurality of network devices to which the merged low-level configuration modification has been applied.

26. The NMS device of claim 18,
further comprising one or more computer-readable storage media having stored thereon a plurality of private data stores;
wherein the one or more processing units are further configured to:
store the first received high-level configuration in a first private data store of the plurality of private data stores; and
store the second received high-level configuration in a second, different private data store of the plurality of private data stores,
generate first dependency information and store the first dependency information in the first private data store;
generate second dependency information and store the second dependency information in the second private data store; and
merge the first low-level configuration modification and the second low-level configuration modification based on the first dependency information from the first private data store and the second dependency information from the second private data store.

27. The NMS device of claim 18, wherein the one or more processing units are further configured to:
form a first snapshot representing current values for elements changed by the first low-level configuration modification; and
form a second snapshot representing current values for elements changed by the second low-level configuration modification.

28. A network management system comprising:
a plurality of network devices;
a network management system (NMS) device configured to manage the plurality of network devices, the NMS device comprising:
a first interface configured to receive high-level configuration for the plurality of network devices;
a second interface configured to communicate low-level configuration to the plurality of network devices; and
one or more processing units, implemented using digital logic circuitry, configured to:
determine a first set of differences between an existing high-level configuration for the plurality of network devices and a first received high-level configuration, received via the first interface, for the plurality of network devices;
determine a second set of differences between the existing high-level configuration for the plurality of network devices and a second received high-level configuration, received via the first interface, for the plurality of network devices, wherein the second received high-level configuration is received separately from the first received high-level configuration;
translate the first set of differences to a first low-level configuration modification for the plurality of network devices;
translate the second set of differences to a second low-level configuration modification for the plurality of network devices;
merge the first low-level configuration modification and the second low-level configuration modification to produce a merged low-level configuration modification; and
apply, via the second interface, the merged low-level configuration modification to low-level configuration of the plurality of network devices.

29. The computer-readable storage medium 28, further comprising instructions that cause the processor to:
form a first snapshot representing current values for elements changed by the first low-level configuration modification; and
form a second snapshot representing current values for elements changed by the second low-level configuration modification.

30. A computer-readable storage medium comprising instructions that, when executed, cause a processor of a network management system (NMS) device that manages a plurality of network devices to:
determine a first set of differences between an existing high-level configuration for the plurality of network devices and a first received high-level configuration for the plurality of network devices;
determine a second set of differences between the existing high-level configuration for the plurality of network devices and a second received high-level configuration for the plurality of network devices, wherein the second received high-level configuration is received separately from the first received high-level configuration;
translate the first set of differences to a first low-level configuration modification for the plurality of network devices;
translate the second set of differences to a second low-level configuration modification for the plurality of network devices;
merge the first low-level configuration modification and the second low-level configuration modification to produce a merged low-level configuration modification; and
apply the merged low-level configuration modification to low-level configuration of the plurality of network devices.

31. The computer-readable storage medium of claim 30, wherein the first low-level configuration modification represents a first modification to a node of low-level configuration information for the plurality of network devices, and wherein the second low-level configuration modification represents a second modification to the node of the low-level configuration information for the plurality of network devices.

32. The computer-readable storage medium of claim 30, wherein the first low-level configuration modification represents a first modification to a parent node of low-level configuration information for the plurality of network devices, and wherein the second low-level configuration modification represents a second modification to a child node of the parent node of the low-level configuration information for the plurality of network devices.

33. The computer-readable storage medium of claim 30, wherein the first low-level configuration modification represents a first modification to a child node of low-level configuration information for the plurality of network devices, and wherein the second low-level configuration modification represents a second modification to a parent node of the child node of the low-level configuration information for the plurality of network devices.

34. The computer-readable storage medium of claim 30, wherein the instructions that cause the processor to apply the merged low-level configuration modification comprise instructions that cause the processor to, for each of the plurality of network devices:
  lock the network device;
  apply the merged low-level configuration modification to the network device; and
  immediately after applying the merged low-level configuration modification to the network device, unlock the network device.

35. The computer-readable storage medium of claim 30, further comprising instructions that cause the processor to perform concurrent service transactions without locking the network devices.

36. The computer-readable storage medium of claim 30, wherein the instructions that cause the processor to apply the merged low-level configuration modification comprise instructions that cause the processor to:
  after applying the merged low-level configuration modification to the low-level configuration of a current network device of the plurality of network devices, determine whether the application of the merged low-level configuration modification was successful;
  when application of the merged low-level configuration modification to the current network device was successful, apply the merged low-level configuration modification to the low-level configuration of a second network device of the plurality of network devices;
  when application of the merged low-level configuration modification to the current network device was not successful, perform a roll-back of the low-level modification of previously modified network devices of the plurality of network devices.

37. The computer-readable storage medium of claim 36, wherein the instructions that cause the processor to perform the roll-back comprise instructions that cause the processor to:
  determine a set of negative differences between the second received high-level configuration and the existing high-level configuration;
  translate the set of negative differences to a negative low-level configuration modification; and
  apply the negative low-level configuration modification to each of the plurality of network devices to which the merged low-level configuration modification has been applied.

38. The computer-readable storage medium of claim 30, further comprising instructions that cause the processor to:
  store the first received high-level configuration in a first private data store; and
  store the second received high-level configuration in a second, different private data store,
  wherein the instructions that cause the processor to translate the first set of differences comprise instructions that cause the processor to generate first dependency information and store the first dependency information in the first private data store;
  wherein the instructions that cause the processor to translate the first set of differences comprise instructions that cause the processor to generate second dependency information and store the second dependency information in the second private data store; and
  wherein the instructions that cause the processor to merge comprise instructions that cause the processor to merge based on the first dependency information from the first private data store and the second dependency information from the second private data store.

* * * * *